Nov. 17, 1964 W. H. SMITH 3,156,997
COMBINED FISHING ROD HOLDER AND SIGNAL MEANS
Filed June 12, 1963
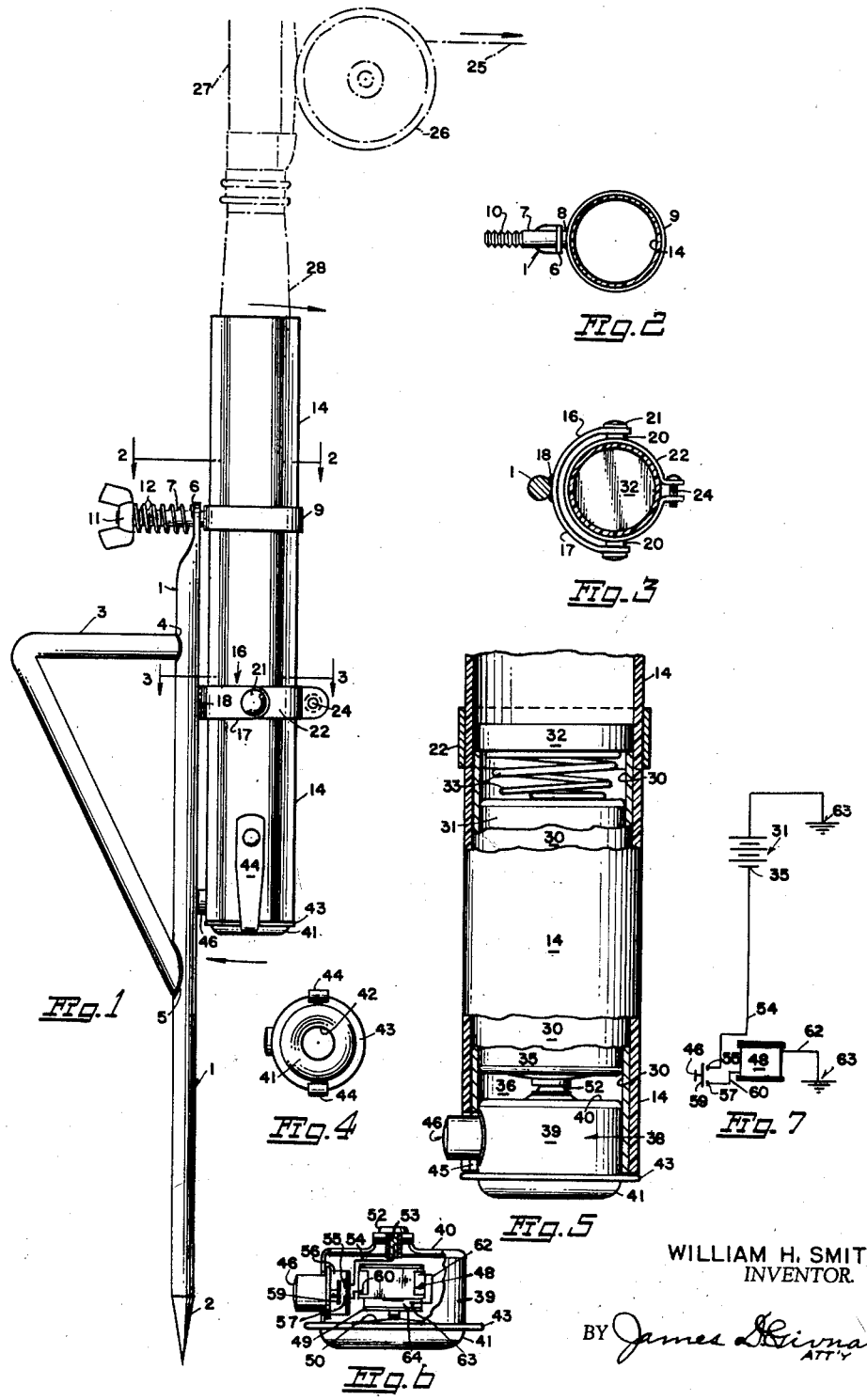
WILLIAM H. SMITH
INVENTOR.
BY James D. Girman
ATT'Y United States Patent Office 3,156,997
Patented Nov. 17, 1964

3,156,997
COMBINED FISHING ROD HOLDER AND
SIGNAL MEANS
William H. Smith, 8406 SE. Flavel St., Portland, Oreg.
Filed June 12, 1963, Ser. No. 287,332
3 Claims. (Cl. 43—17)

This invention relates to improvements in a combination fishing rod holder and audible signal device, wherein the signal such as a horn or buzzer is actuated by the pull of a hooked fish at the end of a fishing line.

It is one of the principal objects of the present invention to provide a socket for receiving and holding the end portion, usually the handle or handle portion of a fishing rod and reel with the reel disposed above the socket and wherein the socket is tiltably mounted on a relatively stationary supporting stake which may be driven into the ground or shore-line and thereby firmly held in an upright position.

Another object is the inclusion of a socket of the character described which contains a horn-type signal similar to a dry cell battery-operated buzzer or horn, commonly used on bicycles.

Another object is the provision of a socket component as aforesaid wherein the horn and battery are fully shielded and protected against moisture, rain water and even such instances where waves washing upon a beach or shore line might conceivably enter the rod holding socket.

A further object is the provision of a combination rod holder and signal of the character described which is of simple efficient durable and inexpensive construction which may be accurately adjusted and thus depended upon to sound the signal regardless of the weight of a hooked fish or the extent of its pull on the fish line. This last mentioned feature is engendered by the utilization of a tension-regulated spring which in turn provides a flexible connection between the rod-holding socket and the ground engaging supporting stake.

A still further object of the present invention is the provision of an adjustable contact means whereby the point of closing an electrical circuit to the signal may be varied to accommodate various weights of fishing poles, bait, tackle, and water conditions such as tide flow, rate of river flow and the like. This adjustable contact means includes a regulatable spring in conjunction with a fulcrum hinge forming a connection between the socket and the ground engaging supporting stake.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a combination fishing rod holder and audible signal device made in accordance with my invention vertically mounted in an operative position. The fishing rod and reel and a fishing line paid out from the reel are shown in broken lines.

FIGURE 2 is a sectional top plan view taken approximately along the line 2—2 of FIGURE 1 with parts omitted.

FIGURE 3 is a similar view taken along the lines 3—3 of FIGURE 1.

FIGURE 4 is a view of the horn-type signal as it appears removably secured to the bottom end of the tubular socket member shown in FIGURE 1.

FIGURE 5 is a fragmentary detail view on an enlarged scale of the bottom portion of the socket member of FIGURE 1 with fragments broken away for convenience of illustration.

FIGURE 6 is a detail view of the audible signal with a fragment of its housing broken away to reveal internal parts, and FIGURE 7 is a wiring diagram.

With continuing reference to the drawing wherein like reference characters designate like parts and particularly FIGURE 1 thereof, reference numeral 1 indicates generally a relatively stationary rigid support in the form of a stake pointed as at 2 at its bottom end, and for convenience in being driven into the ground either by hand or foot pressure I provide a bracket 3 welded to the stake 1 in two places as at 4 and 5.

The top end of the stake 1 is flattened as at 6 and provided with an opening therethrough for the reception of a pin 7 (see also FIGURE 2) welded as at 8 at its inner end to a band 9 and threaded for a portion of its length as at 10 to accommodate a wing nut 11. A compression spring 12 surrounds the pin 7 with one of its ends bearing against the flat top end 6 of the stake 1 and with its outer end bearing against the wing nut 11. Accordingly the compression load on the spring 12 can be varied by advancing or retracting the wing nut on the threads of the pin 7.

The fishing rod holder is in the form of a socket 14 which is preferably, though not restrictively, made of plastic and is secured to the band 9 by a forced fit therethrough.

Between the band 9 and the bottom of the socket 14 I provide a hinge assembly generally indicated at 16 (see also FIGURE 3) which comprises a U-shaped bracket 17 secured as at 18 by welding or the like to the stake 1. The free ends of the arms of the bracket 17 have openings therethrough for hinged attachment to diametrically opposed pins 20 rivetted or headed as at 21 at their outer ends and secured at their inner ends by welding or the like to a clamping band 22 surrounding the socket 14 and secured thereto by a clamping screw 24.

From the foregoing it will be readily apparent that the hinge pins 20 establish a fulcrum point for tilting movement of the socket 14 relative to the stake 1 as indicated by the applied directional arrows when an outward pull is exerted upon a fishing line 25 paid out from a reel 26 mounted upon a conventional fishing pole 27 held in an upright position by its handle 28 within the socket 14.

Removably fitted within the lower portion of the socket 14 is a metallic cylinder 30 to serve as a housing for a dry cell battery 31 provided with the usual outside covering of dielectric material.

Superjacent the top of the battery 31 is an abutment in the form of a metal disc 32 secured within the socket 14 by the compressive forces of the clamping band 22.

A compression spring 33 is interposed between the disc 32 and the top end terminal of the battery 31. The other terminal 35 at the bottom end of the battery is positioned above the matching bottom ends of the battery housing 30 and the socket 14 to provide a downwardly opening space 36 for the reception of a horn or buzzer indicated generally at 38 and comprising a cylindrical housing 39 having a top wall 40 and a removable dish-shaped bottom wall 41 having a sound emitting opening 42 therein. This bottom wall is provided with a clamping rim 43 by means of which the wall is attached to a flange, not shown, at the bottom end of the housing 39.

The bottom end of the socket 14 is provided with a downwardly opening slot 45 to accommodate a push-button 46 extending outwardly from the horn or buzzer housing 39 and also outwardly from the socket 14 for operative contact with the stake 1 as will be more fully hereinafter be described. The assembly, including the battery housing spring 33, battery 35 and horn or buzzer component 38, securely held within the socket 14 by means of spring fingers 44, riveted or otherwise secured to the outside wall of the socket as shown. The bottom ends of the fingers are hook-shaped for spring-urged engagement with the underside of the rim 43 of the horn or buzzer housing 38. Thus it will be seen that this unitary assembly may be conveniently placed within or removed from the interior of the socket 14.

With particular reference to FIGURES 6 and 7, it will be seen that the interior of the horn or buzzer housing 39 is provided with a coil 48 for actuating an armature 49 which in turn operates the horn or buzzer diaphragm 50 in the conventional manner. The bottom battery terminal 35 in the assembly shown in FIGURE 5 is in electrical circuit with a contact 52 insulated from and extending upwardly through the top wall 40 of the horn housing 39. The contact 52 may be in the form of a hollow rivet to whose interior is soldered, or otherwise secured, as at 53, one end of an electrical conductor 54 whose opposite end terminates in a contact 55 carried by a bracket 56 of dielectric material secured to the interior of the horn housing 39 in any suitable manner. A companion contact 57 is also carried by the bracket 56 and both contacts 55 and 57 are in the path of inward movement of a normally open or outwardly spring-urged switch plate 59 operable by the push-button 46 to close the electrical circuit across both contacts 55 and 57. The contact 57 is connected by wire 60 to one side of the coil 48 whose opposite side is connected by wire 62 to a ground connection 63 on a resilient support 64 for the armature 49 and the coil is thus in circuit with the terminal at the top end of the battery 31 through the medium of the metallic battery housing 30, disc 32 and compression spring 33.

With the parts assembled as a finished product, as shown in FIGURE 1, and with the stake 1 firmly driven into the ground, or with the assembly otherwise secured to some other anchorage by any suitable means such as clamps or the like, it will be obvious that a pull on the fish line 25 to the right as arrow-indicated will tilt the socket 14 to the right about the fulcrum points 20 against the resistance of the compression spring 12 causing the bottom end of the socket to move toward the stake 1 which will cause the push-button 46 and the switch plate 59 to be pushed inwardly to close the electrical circuit across the normally open contacts 55 and 57 and thereby energize the coil 48 to actuate the signal produced by the horn or buzzer whichever the case may be, and the signal will continue to operate as long as there is a pull on the line 25 or until the fishing pole is removed from the socket 14. Such removal will of course enable the spring 12 to restore the socket to its vertical or inoperative circuit-breaking position.

I have shown and described the socket 14, as being made of plastic or similar material, for light weight construction, and since such material is a non-conductor of electricity, its use as such, enables the use of the novel metallic battery housing 30 as an electrical conductor from the top terminal of the battery 35 through the ground connections 33, 32, 30 (battery housing), and 63 to the coil 48 and back through the push-button switch, conductor 54 and contact 52 to other battery terminal 35.

It will be readily understood that in another embodiment of the invention the metallic battery housing 30 could be dispensed with by utilizing a metallic socket 14 instead of one made of plastic or other non-conductive material and using the metallic socket, metal disc 32 and spring 33 as a ground connection between the top battery terminal and the metallic horn or buzzer housing 39 and then through a conventional push-button switch to close the circuit from the housing 39 to the other battery terminal 35.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A fishing rod holder and a signal electrically operable by a pull on a fishing line paid out from the fishing rod, comprising in combination,
   a normally substantially vertically disposed fishing rod-holding cylinder of dielectric material,
   a metallic abutment secured transversely within said cylinder intermediate the ends thereof,
   a metallic cylinder within said rod-holding cylinder in contact at its top end with said abutment and opening downwardly at its bottom end,
   means anchoring said rod-holding cylinder in a fixed location,
   means hingedly attaching said rod-holding cylinder to said anchoring means whereby the rod-holding cylinder is tiltable relative to said anchoring means,
   an electric battery carried on the interior of said metallic cylinder and in circuit therewith at one of its ends through said metallic abutment,
   an electrically operable signal removably secured within said metallic cylinder and normally in open circuit therethrough with said battery,
   pressure-responsive electric circuit-closing means carried by said signal adjacent said anchoring means whereby tilting movement of said rod-holding cylinder toward said anchoring means will actuate the circuit closing means to close the circuit from the battery through said abutment, metallic cylinder and said electrical signal to energize the same.

2. A fishing rod holder and a signal electrically operable by a pull on a fishing line paid out from said fishing rod, comprising in combination,
   a normally substantially vertically disposed fishing rod-holding hollow cylindrical socket,
   an impervious solid metal disc secured within said socket dividing the same into upper and lower portions and thus providing a water-tight seal for said lower portion,
   means anchoring said rod-holding socket in a fixed location,
   means hingedly attaching said socket to said anchoring means whereby the socket is tiltable relative to the anchoring means,
   an electric battery carried by said socket within said lower portion thereof,
   electrical conductor means surrounding said battery and in closed circuit with one side thereof through said metal disc,
   an electrically operable signal carried by said socket within the lower portion thereof normally in open circuit with the other side of said battery, and
   pressure-responsive circuit closing means carried by said lower portion of said socket extending outwardly therefrom adjacent said anchoring means and in circuit with said signal and said battery whereby tilting movement of said socket toward said anchoring means will actuate the circuit-closing means to close the circuit to said electrical signal to energize the same.

3. A fishing rod holder and an audible signal electrically operable by a pull on a fishing line paid out from a fishing rod held by said rod holder,
   said rod holder comprising a normally substantially vertically disposed hollow tubular member of dielectric material,
   electrical conductor means transversely secured within said tubular member dividing the same into a downwardly opening lower portion and an upwardly opening rod-receiving portion,
   means anchoring said rod holding tubular member in a fixed location,
   means hingedly attaching said tubular member to said anchoring means for tiltable movement toward and away from said anchoring means, a hollow metallic cylinder removably held by a forced fit within said lower portion of said dielectric rod holding tubular member, a source of electrical energy and an electrically operable signal both similarly held within said metallic cylinder and in circuit with said electrical conductor and said metallic cylinder, and pressure-responsive circuit-closing means carried by said signal and extending outwardly from said metallic and dielectric cylinders adjacent said anchoring means whereby tilting movement of said dielectric cylinder toward said anchoring means will actuate the circuit-closing means to close the electric circuit from said source through said electrical conductor and said metallic cylinder to said signal to energize the same.

References Cited by the Examiner

UNITED STATES PATENTS

| | | | |
|---|---|---|---|
| 2,454,896 | 11/48 | Traub | 200—61.41 |
| 2,909,860 | 10/59 | Braun | 43—17 |
| 3,010,239 | 11/61 | Johnson | 43—17 |

FOREIGN PATENTS 463,794   3/50   Canada.

ABRAHAM G. STONE, *Primary Examiner.*